(12) United States Patent
Dwarakanathan

(10) Patent No.: US 11,115,365 B1
(45) Date of Patent: Sep. 7, 2021

(54) MESSAGING OVERFLOW SERVICE

(71) Applicant: Amazon Technologies, Inc., Seattle, WA (US)

(72) Inventor: Srinivasan Dwarakanathan, San Diego, CA (US)

(73) Assignee: Amazon Technologies, Inc., Seattle, WA (US)

(*) Notice: Subject to any disclaimer, the term of this patent is extended or adjusted under 35 U.S.C. 154(b) by 267 days.

(21) Appl. No.: 15/662,069

(22) Filed: Jul. 27, 2017

(51) Int. Cl.
  *G06F 15/16* (2006.01)
  *H04L 12/58* (2006.01)
  *H04L 29/08* (2006.01)
  *H04L 12/26* (2006.01)

(52) U.S. Cl.
  CPC .......... *H04L 51/22* (2013.01); *H04L 43/0852* (2013.01); *H04L 67/2842* (2013.01)

(58) Field of Classification Search
  CPC .. H04L 51/22; H04L 43/0852; H04L 67/2842
  USPC ........ 709/206, 203, 221, 224; 711/174, 135, 711/147; 370/412
  See application file for complete search history.

(56) References Cited

U.S. PATENT DOCUMENTS

| | | | | |
|---|---|---|---|---|
| 9,921,857 B1* | 3/2018 | Kaplan | ............... | G06F 9/44526 |
| 2006/0294596 A1* | 12/2006 | Govindarajan | ..... | G06F 12/1441 |
| | | | | 726/27 |
| 2008/0168064 A1* | 7/2008 | Dorsey | ................... | G06F 16/10 |
| 2009/0129400 A1* | 5/2009 | Dibiaso | ............... | H04L 63/1416 |
| | | | | 370/412 |
| 2010/0218223 A1* | 8/2010 | Simpson | ............... | H04N 5/782 |
| | | | | 725/58 |
| 2012/0124294 A1* | 5/2012 | Atkisson | ............... | G06F 11/108 |
| | | | | 711/135 |
| 2014/0189714 A1* | 7/2014 | Lawbaugh | .......... | H04L 41/0253 |
| | | | | 719/313 |
| 2014/0201123 A1* | 7/2014 | Ahn | ....................... | H04L 41/16 |
| | | | | 706/47 |
| 2016/0203053 A1* | 7/2016 | Talagala | ............. | H04L 67/1097 |
| | | | | 714/6.12 |
| 2018/0203748 A1* | 7/2018 | Crowther | ............ | G06F 13/4282 |
| 2018/0373771 A1* | 12/2018 | Ashwood-Smith | ... | G06F 9/5027 |

* cited by examiner

*Primary Examiner* — Thuong Nguyen
(74) *Attorney, Agent, or Firm* — Nicholson De Vos Webster & Elliott LLP

(57) ABSTRACT

A technology is provided for reducing latency in a messaging system. Unprocessed messages in a message queue are consumed via a messaging overflow service launched in response to an alarm triggered by a monitoring service that indicates the message queue has reached a predetermined threshold. The unprocessed messages are processed via the messaging overflow service to generate a processed data store values. The processed data store values are stored in a cache associated with the messaging overflow service.

20 Claims, 10 Drawing Sheets

MESSAGING OVERFLOW SERVICE

BACKGROUND

Electronic devices and computing systems have become ever-present in many aspects of society. Computing systems may include computing and data storage systems to process and store data. Some computing systems have begun offering centralized, virtual computing options known as service provider environments that may reduce overall costs, improve availability, improve scalability, and reduce time to deploy new applications. For example, some computing systems may act as a service that provides virtual computing, virtual storage, virtual networking, virtual messaging and other virtual services as purchased for variable periods or on a pay-per-use basis (e.g., customers pay for a certain amount of messaging transactions or bandwidth) from large pools of re-purposable, multi-tenant computing resources or services.

Advancements in communication technologies and an increasing variety of hardware and applications have allowed most electronic devices to communicate with other devices, services, and computing systems over a computer network. As more computing systems connect to networks and virtual computing systems, the volume of messages being sent is increasing. Service provider environments may provide a messaging service that is distributed across a plurality of underlying servers and/or devices. The messaging service may be a fully managed message service for reliably communicating among distributed software components, devices and/or services at any scale. A messaging service that is distributed may make decoupling and coordinating the components of a distributed application easier and more cost-effective. Using the messaging service, messages may be sent, stored, and received between software components and devices at any volume, without losing messages or without defining other services to be always available. In addition, a messaging service may provide queueing, high throughput, ordering, and at-least-once delivery.

DETAILED DESCRIPTION

Figure 1A:
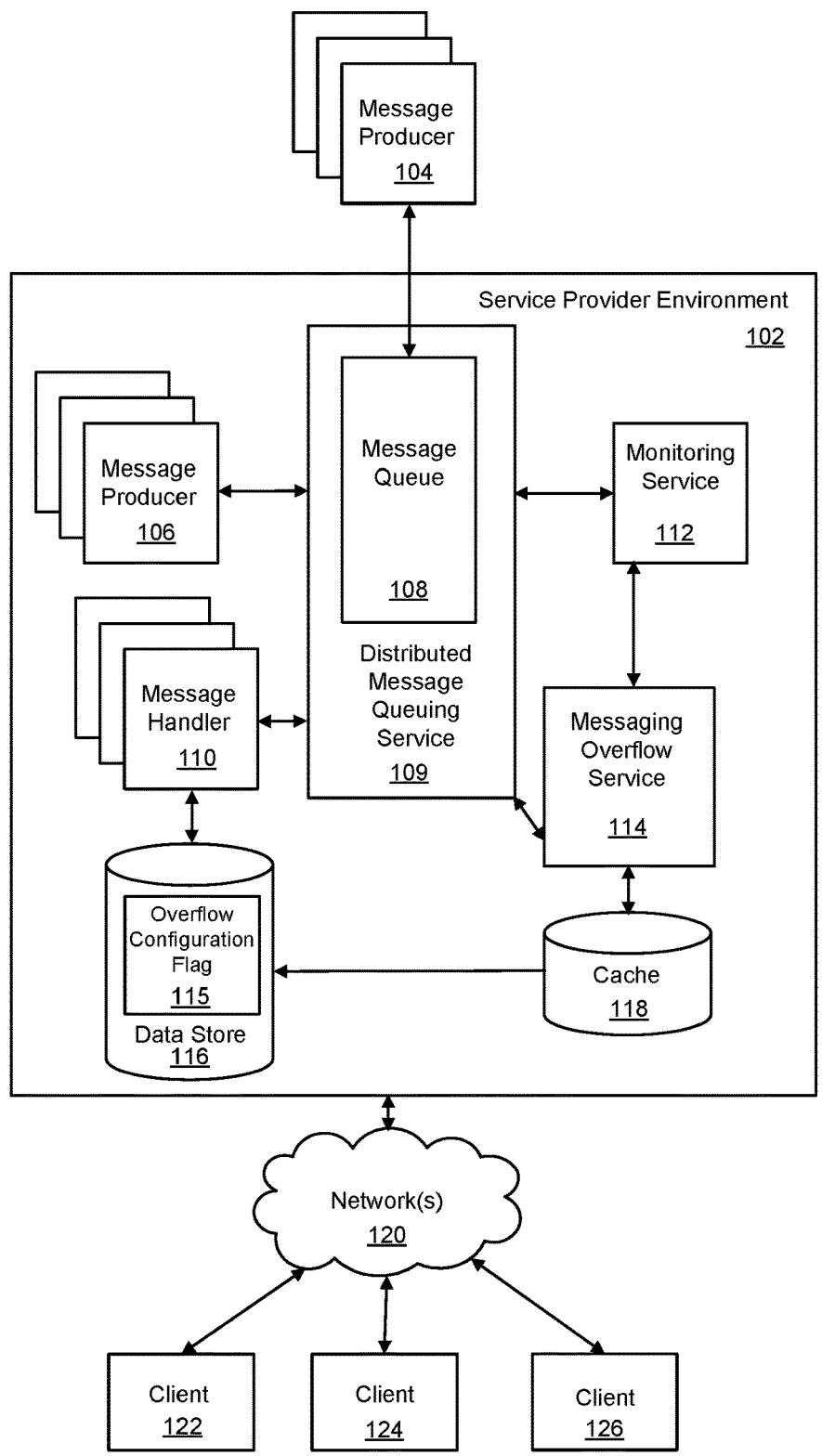
FIGS. 1A-1C are block diagrams illustrating a messaging service using a messaging overflow service according to an example of the present technology.

A technology is provided for using a messaging overflow service associated with a messaging queuing service to consume messages from a message queue in the messaging service when the message queue is experiencing a heavy messaging load. The messaging overflow service may be described as a dynamic service that launches in response to latency or message overflow detected in association with the messaging service. For example, a data store may be used to store results or processed data store values from messages received from the message queue once the message is processed. The message may be processed by message handlers. If the message queue is under heavy load, such as if the unprocessed messages in the message queue have reached a predetermined threshold (e.g., a pre-defined number of messages threshold or a delay time for processing messages), then the data store may be experiencing latency and this latency may cause the message handlers to not process the messages within a time limit set by the messaging service. When the messages are not processed in time, a query process seeking query results from the data store with information from the messages being processed may not receive the most correct or updated query results. Increasing the capacity of the data store or scaling the data store may be a slow and expensive process that may not be accomplished in time to deal with the heavy, immediate load being experienced by the message queue of the messaging service. The present technology employs a messaging overflow service to assist in handling the unprocessed messages during a heavy load. The messaging overflow service and the messaging service (or components of the messaging service such as the message queue and the data store) may be separate computing components hosted within a service provider environment.

A monitoring service may monitor the message queue and when unprocessed messages in the message queue reach a predetermined threshold (e.g., a number of messages or volume of messages) then the monitoring service triggers an alarm. The monitoring service may monitor metrics of the messaging service including monitoring the message queue. For example, the monitoring service may monitor the number of messages unprocessed in the message queue, an average number of unprocessed messages in the message queue over a time period, or the total size of the payloads of unprocessed messages in the message queue. The monitoring service may directly or indirectly monitor a latency experienced by a data store associated with the message queue.

The alarm triggered by the monitoring service may launch the messaging overflow service which then consumes at least a portion of the unprocessed messages from the message queue, and the messaging overflow service may process the messages. The message handers accessing the messaging service may store results from processing messages or a processed data store value in a data store while the messaging overflow service stores a processed data store value in a cache in communication with the messaging overflow service.

A query that has initiated a query process may query the data store for values such as the processed data store values to provide a query result. While the messaging overflow service is storing processed data store values into the cache, the messaging overflow service may cause or instruct the query process to check both the data store and the cache associated with the messaging overflow service for queried values. The messaging overflow service may employ an overflow configuration flag to cause the query process to check both the data store and the cache. The overflow configuration flag may be placed in the data store such that the query process may first query or check the data store for a queried value and the overflow configuration flag may then instruct the query process to also check the cache for the queried value. The messaging overflow service in conjunction with the cache and the overflow configuration flag ensure that the most updated values are received in response to a query.

The messaging overflow service may shut down or stop consuming messages from the message queue after the messaging overflow service has processed a defined portion or defined number of the unprocessed messages from the message queue or all of the unprocessed messages have been consumed from the message queue. Then the messaging overflow service may update the data store with processed data store values from the cache in order to consolidate the data store values from the cache into the data store. Once a processed data store value has been updated to the data store from the cache, the processed data store value in the cache may be removed or deleted. In one aspect, once the messaging overflow service has incorporated the processed data store values from the cache into the data store and the messaging overflow service has shut down, the overflow configuration flag may be cleared or removed from the data store such that a query process will no longer be instructed to check both the data store and the cache.

In one aspect, the message queue continues to receive subsequent messages while the message queue has messages being consumed by the messaging overflow service. The message handlers for the message queue may process the subsequent messages in parallel to the messaging overflow service processing the unprocessed messages. This simultaneous processing of messages by both the message queue and the messaging overflow service allows the heavy load being experienced by the message queue to be processed in a more efficient manner. The messaging overflow service may be implemented in many different types of messaging systems, such as a distributed message queuing service or a messaging service based on a publish-subscribe model or other types of messaging services.

FIG. 1A illustrates a computing environment 100 for sending and receiving messages according to an example of the present technology. The computing environment 100 may include a service provider environment 102 and components for or associated with a distributed message queuing service 109, such as a message queue 108.

The service provider environment 102 may be described as a plurality of computing systems or services employed to provide virtualized computing services accessible to other devices or software via a network 120 (e.g., the internet). In one aspect, the service provider environment 102 includes a message producer 106, a message queue 108, a message handler 110, a data store 116, a monitoring service 112, a messaging overflow service 114, and a cache 118 which may each be a virtualized component, service or server executing within the service provider environment 102. For example, the message producer 106, the message queue 108, and/or the message handler 110 may each be executing on a virtual computing instance within the service provider environment 102. Alternatively, the message producer 106 and message handler 110 may be portions of an application executing in a function execution service that executes functions or portions of code virtually. Messages may also be produced outside of the service provider environment by message producers such as a message producer 104. Each of the message producers 104 and 106 may represent a plurality of message producers. The message producers 104 and 106 may generate or produce messages (e.g., from distributed applications) to be sent to the message queue 108.

In one aspect, the service provider environment 102 may be connected to clients 122, 124, and 126 via the network 120. It should be appreciated that the clients 122, 124, and 126 may be computing devices such as desktop computers, mobile devices, smart phones, set-top boxes, tablet computers, internet of things (IoT) devices, or message producers. The clients 122, 124, and 126 may also be able to produce messages sent to the message queue 108. The messaging service represented by the computing environment 100 may include more than one message queue.

The message queue 108 may host or hold messages that are to be processed. For example, the message handler 110 may obtain messages from the message queue 108 and process the message to generate a processed data store value or data store entry. A given message may have a singular processed data store value or plural processed data store values. For example, the processed data store value may be a key value pair, a relational data store row, a simple object, or some other type of value or entry may be generated and the processed data store value may be stored in the data store 116. The data store 116 may be a data store that is virtualized data store hosted with the service provider environment 102, or the data store may be located outside of the service provider environment 102. The message handler 110 may represent a plurality of message handlers. The computing environment 100 may comprise any number of message handlers executing as processes on a computing instance, server or within a service. The messages may also be referred to as notifications. The messages in a message queue 108 may have a time or a notification time in which the messages are to be processed or the message may be marked as undeliverable and a message producer may be notified of the message delivery failure (e.g., message may be sent to a dead letter queue). Alternatively, message delivery may be continuously retried but this maintains the message queue congestion. When the message queue 108 is under a heavy load, the messages in the message queue 108 that are unprocessed by the message handlers 110 may begin to build up due to data store 116 latency or message handler 110 latency. Thus, the message handler 110 may not be able to process the unprocessed messages in the message queue 108 before the notification time expires for messages in the message queue 108. This may cause query process to not receive the most updated values when the query process queries the data store 116.

The present technology may monitor the message queue 108 to determine if the message queue 108 is under a heavy load or otherwise experiencing an overflow. The may be accomplished via the monitoring service 112. The monitoring service 112 may be a monitoring service that is able to monitor the resources executing in a public computing environment such as the service provider environment 102. The monitoring service 112 may collect and track metrics, collect and monitor log files, set alarms, and automatically react to changes in the service provider environment 102. The monitoring service 112 may be set to trigger an alarm when the unprocessed messages reach a predetermined threshold. The predetermined threshold may be any criteria that indicates the message queue 108 or the data store 116 is experiencing latency. For example, the predetermined threshold may be a total number of unprocessed messages in the message queue 108 or may be a total size of the payload of all of the unprocessed messages combined. In another example, the alarm may trigger for a predetermined threshold where the message queue 108 is 90% full or if there are 108,000 messages in the queue and queue is limited to processing 120,000 messages.

The monitoring service 112 may also trigger an alarm if an unprocessed messages has remained in the message queue 108 for a predetermined or predefined amount of time. For example, if a message remains unprocessed in the message queue 108 for 2 minutes, the monitoring service 112 may trigger an alarm. In another example, if messages take longer than a predetermined time, such as 2 minutes, to process out of the message queue and this occurs for a plurality of messages for a continuous period, such as 5 minutes, then the monitoring service will trigger an alarm. The monitoring service 112 may also monitor latency associated with the data store 116. Latency in the data store 116 may be detected by the monitoring service 112 directly or indirectly. For example, if the messages in the message queue 108 have reached a predetermined threshold then the monitoring service 112 may infer or determine that the data store 116 is experiencing latency. If the data store 116 experiences latency above a threshold, then the monitoring service 112 may trigger an alarm. The predetermined threshold may be automatically configured with default settings, or may be manually adjusted by a user.

In one aspect, an alarm triggered by the monitoring service 112 may cause the messaging overflow service 114 to be launched and take action to consume some unprocessed messages in the message queue 108. The messaging overflow service 114 may consume all of the messages currently in the message queue 108 or the messaging overflow service 114 may only consume a portion of the messages in the message queue 108. For example, the messaging overflow service 114 may consume a set number of messages. In another example, the messaging overflow service 114 may consume a percentage of messages from the message queue 108 (e.g., 50% of the messages). The messaging overflow service 114 may consume or pull messages from the message queue 108 until a number of messages or a percentage threshold is reached after the messaging overflow service 114 has been launched. In another configuration, the messaging overflow service 114 may consume messages from the message queue 108 for a defined period of time (e.g., for 2 minutes). In one aspect, a message storm may detected and if more than a certain number of messages per a time unit (e.g. a period of time in seconds or minutes) are received then the messaging overflow service 114 will be launched and consume messages until the message storm falls below a certain number of messages per a time unit. The messaging overflow service 114 may also consume messages from the message queue 108 until the messages in the message queue 108 fall below the predetermined threshold.

The messaging overflow service 114 may be launched or activated by the alarm. The messaging overflow service 114 may consume all or a portion of the unprocessed messages in the message queue 108 and then process the unprocessed messages and store the results of the processed messages in the cache 118. In one aspect, the messaging overflow service 114 include messages handlers internally that are able to process the messages from the message queue 108 similar to how the messages are processed by the message handler 110. In one aspect, the messaging overflow service 114 works in conjunction with the message handler 110 or other message handlers to process the unprocessed messages. The results of processing a message via the messaging overflow service 114 may be referred to as a processed data store value. The messaging overflow service 114 may store the processed data store value in a cache 118 associated with the messaging overflow service 114. For example, the processed data store value may be a key value pair, a relational data store row, a simple object, or some other type of value or entry may be processed. In one aspect, the cache 118 may use a storage service that uses solid state drive (SSD) hardware or another type of hardware storage component. Similarly, the cache may the local store memory of a computing instance or virtualized server. Alternatively, a simple key value data store (NoSQL) service may be used to store the cached data. Due to the messaging overflow service 114 consuming unprocessed messages from the message queue 108, the messaging overflow service 114 is able to relieve impacts to the data store 116 and message queue 108 during a heavy messaging load. This may allow the messages in the message queue 108 to be processed before a notification time has expired and the data in the data store 116 begins to return invalid information. The process of monitoring the message queue 108 and activating the messaging overflow service 114 may be more cost effective and faster than expanding the capabilities of the data store 116 to compensate for a temporary heavy message load.

In one aspect, the messaging overflow service 114 may be configured to launch on a compute service and is a segment of program code that is capable of receiving parameters, performing processing, returning values, and the program code is terminated at the computing instance once the messaging overflow service returns values. The program code may be launched with parameters that indicate the message queue to consume messages from, when to stop consuming messages, and the cache location for writing the processed data store values. When the program codes stops consuming messages, due to: the message queue being empty, a number of messages has been consumed, or another condition being met, then the program code may terminate and the program code resources may be released.

A query and an associated query process may query the data store 116 for a processed data store value or values. The messaging overflow service 114 may instruct a query process to check both the data store 116 and the cache 118 for processed data store values. This avoids creating a consistency issue where the processed data store value is stored in the cache 118, and the data store 116 may not have that particular processed data store value. Once the messaging overflow service 114 has processed all of the messages that were consumed by the messaging overflow service 114, the messaging overflow service 114 may shut down. Before the messaging overflow service 114 shuts down, the data store 116 may be updated with the processed data store values that were stored in the cache 118. This allows the data store 116 to comprise the most updated processed data store values. Once the data store 116 is updated with the processed data store values from the cache 118, and the messaging overflow service 114 is shut down, the query processes may no longer be instructed to check both the cache 118 and the data store 116 but instead may only check the data store 116. A query process may be a process launched from a component within the service provider environment 102 or may be launched by the clients 122, 124, and 126 as further illustrated in FIG. 3. For example, client 122 may have a query process that queries the data store 116 for a processed data store value. In one example, the cache 118 continuously updates the processed data store values to the data store 116 (e.g., one or two processed data values at a time). Alternatively, the cache 118 may update the processed data store values to the data store 116 all at one time.

In one aspect, the messaging overflow service 114 will shut down in response to a notification from the monitoring service 112. For example, the monitoring service 112 may continue to monitor the message queue 108 after the messaging overflow service 114 has been launched. If a subsequent number of messages in the messaging overflow service 114 fall below a termination threshold then the messaging overflow service 114 may be sent a notification from the monitoring service 112 to shut down. In one aspect, the messaging overflow service 114, once launched, will monitor the message queue 108 and the messaging overflow service 114 will shut down when the messaging overflow service 114 determines that the message queue 108 has unprocessed messages that are below a predetermined threshold. In one aspect, the data store 116 will be upgraded or scaled to increase the capabilities of the data store 116 during the operations of the messaging overflow service 114. Once the data store 116 has upgraded, the messaging overflow service 114 may shut down. The messaging overflow service 114 may be configured to shut down after all the unprocessed messages consumed from the message queue 108 are processed and transferred from the cache 118 to the data store 116. In one example, the messaging overflow service 114 may be configured to shut down, if latency in the data store 116 is below a predetermined threshold as measured by the monitoring service 112.

The messaging overflow service 114 may consume the unprocessed messages from the message queue and before the messaging overflow service 114 shuts down or finishes processing the unprocessed messages, the message queue 108 continues to receive subsequent messages from the message producers. The subsequent messages may be processed by the message handler 110 in parallel to or simultaneous to the messaging overflow service 114 processing messages. This parallel handling of messages allows the messaging system to continue efficiently handle a large number of messages before the notification time of the messages expires or the messaging queue overflows. In one aspect, after all of the unprocessed messages initially consumed by the messaging overflow service 114 from the message queue 108 are processed, the messaging overflow service 114 may consume subsequent unprocessed messages that are in the message queue 108. In another aspect, the monitoring service 112 continues to monitor the message queue 108 after the messaging overflow service 114 has been activated and consumes messages from the message queue 108. The monitoring service 112 may determine that the subsequent messages in the message queue 108 have again caused the predetermined threshold associated with the message queue 108 to be exceeded. The monitoring service 112 may then notify the messaging overflow service 114 to consume the subsequent messages from the message queue 108 until a termination threshold is reached where a minimum number of messages is in the queue (e.g., 10% of what originally was in the queue, 10% of the queue capacity or zero messages).

In one aspect, the messaging overflow service 114 may place an overflow configuration flag 115 in the data store 116 while the messaging overflow service 114 is active and processing messages with processed data store values stored in the cache 118. The overflow configuration flag 115 may notify or instruct a query process that is querying the data store 116 to check the cache 118 for processed data store values in addition to the data store 116. Thus, the overflow configuration flag 115 may ensure that the query processes receive the most updated processed data store values. Once the data store 116 has been updated with the processed data store values from the cache 118, the processed data store values in the cache 118 may be deleted and the overflow configuration flag 115 may be cleared or removed from the data store 116.

In one example, in place of the overflow configuration flag 115, an overflow checking process may execute or run in association with the data store 116. In response to a request from a query process, the overflow checking process may check to see if the cache 118 or the messaging overflow service 114 is executing. If the overflow checking process responds with a yes to the query process, then query process that is querying the data store 116 knows to also check the cache 118.

Figure 1B:
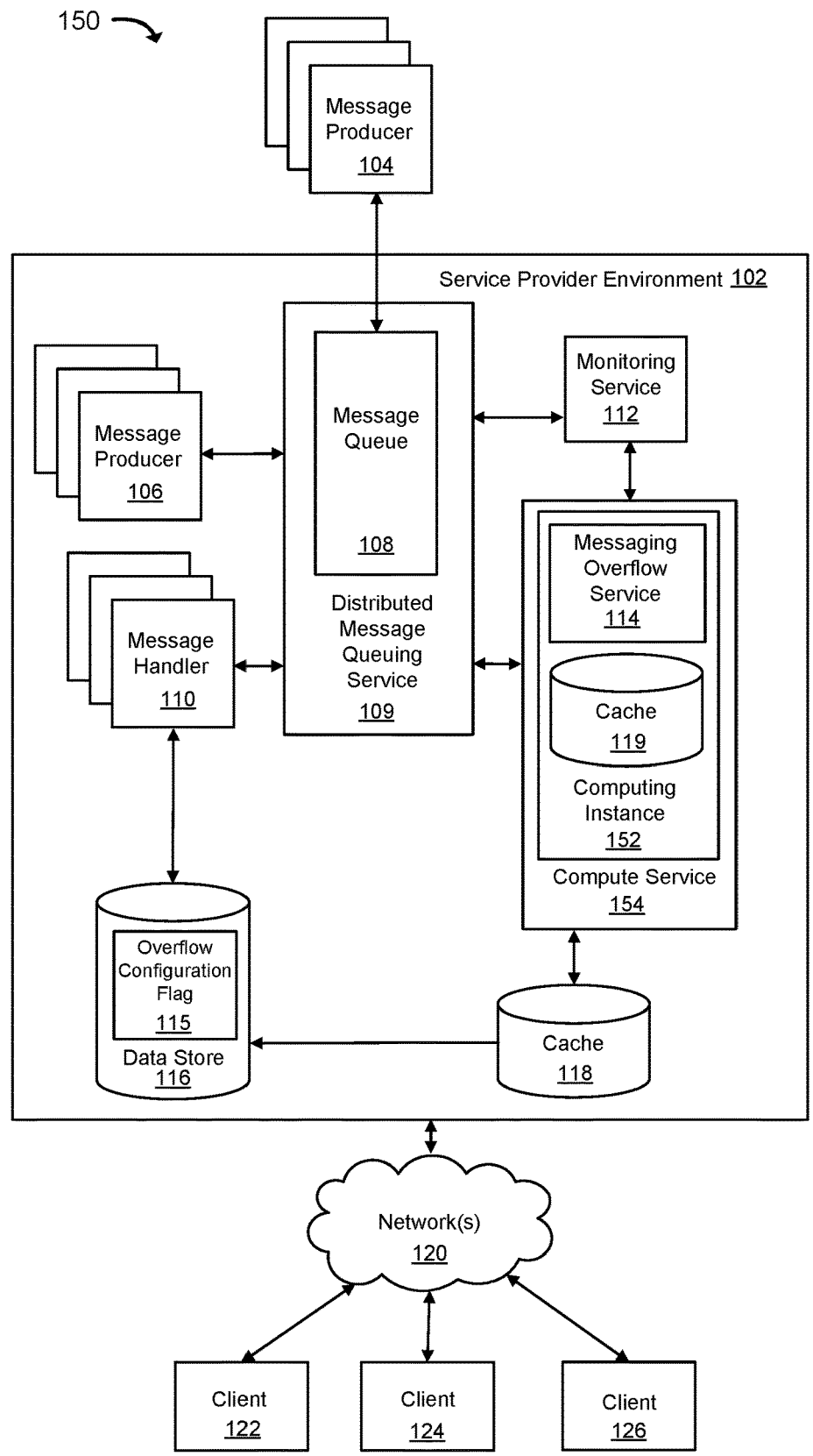

FIG. 1B illustrates a computing environment 150 for sending and receiving messages according to an example of the present technology. The computing environment 150 may include a computing instance 152 hosted by a compute service 154 in the service provider environment 102. The computing instance 152 may be a virtual computer or other computing resource executing on the compute service 154.

In one aspect, the messaging overflow service may be a segment of program code 115 that is configured to launch or execute in a container in the computing instance 152 in a compute service 154 in response to an alarm triggered by the monitoring service 112. The segment of program code may be capable of receiving parameters, and performing processing, and the program code may be terminated at the computing instance 152 once the messaging overflow code 115 completes. The program code may be a segment of program code that may be like a function, and the program code may receive parameters, perform processing and provide return values. The program code may also be called a "compute service code" or "compute service program code." In one aspect, the program code may execute on a managed compute service code platform for web services that runs a defined program code on the computing instance 152. That is, the program code may execute in a compute service 154 that runs code in response to requests to execute the program code, and automatically manages the compute resources used by that program code. Once a program code has been executed and the appropriate messages have been consumed, the program code and results may be flushed from memory of the computing instance 152 or container in which the program code was executing. The program code provides for building smaller, on-demand applications that may be responsive to events and new information. For example, the program code may be used to automatically provision back-end services triggered by custom program code requests.

In one alternative configuration, the computing instance 152 may host a cache 119 associated with the messaging overflow service 114. For example, the cache 119 may be launched or activated in response to the alarm triggered by the monitoring service 112 or the cache 119 may be created by the messaging overflow service 114. The messaging overflow service 114 may employ a cache executing on the same computing instance as the messaging overflow service 114, such as cache 119. Further, the messaging overflow service 114 may employ a cache 118 outside of the computing instance, which is executing the messaging overflow service 114 or both caches may be used.

Figure 1C:
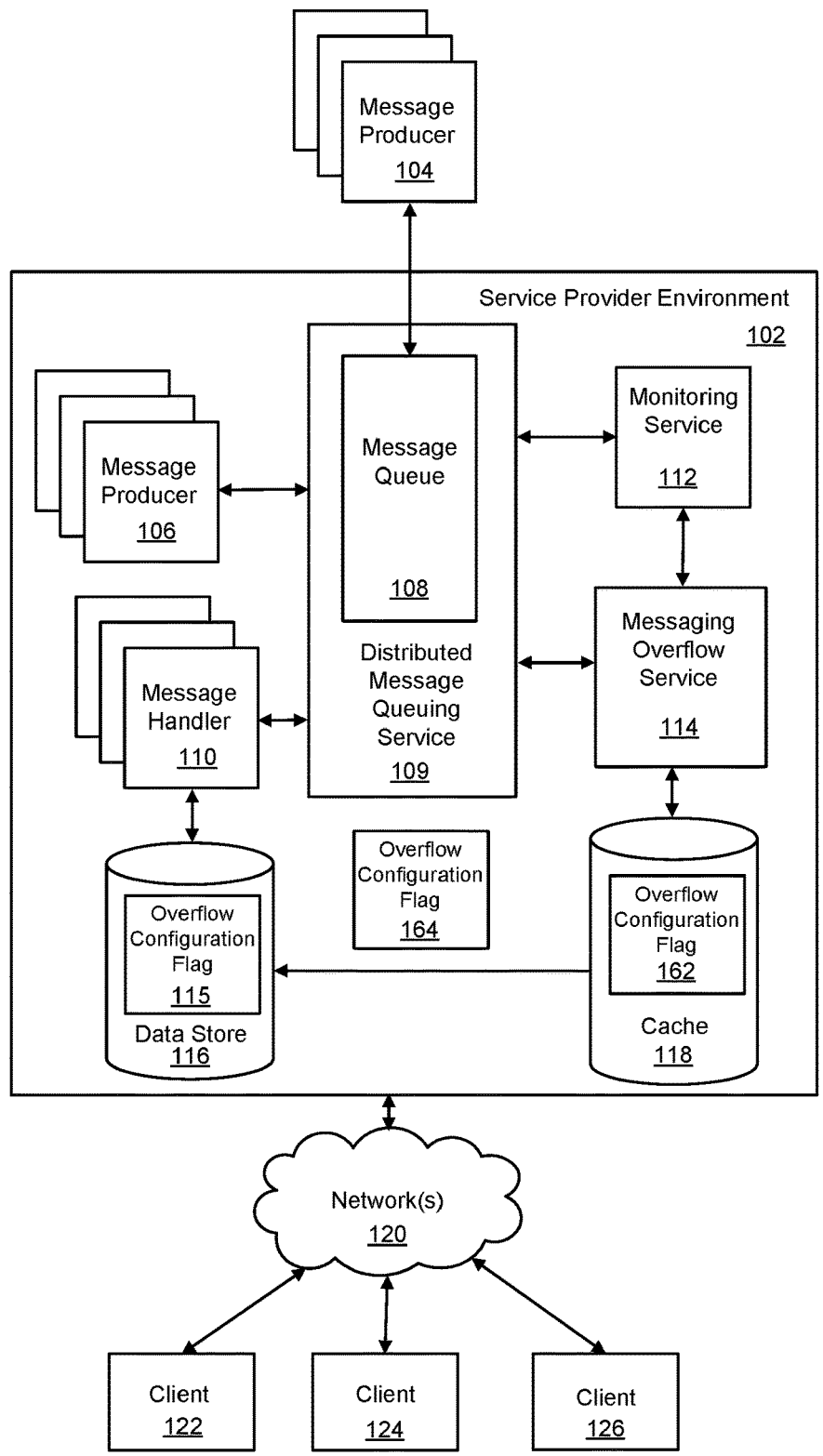

FIG. 1C illustrates a computing environment 160 for sending and receiving messages according to an example of the present technology. The computing environment 160 may include an overflow configuration flag that may be stored in any of multiple locations in the service provider environment 102. The overflow configuration flag 162 may be located in the cache 119 such that a query process that checks the cache 118 for a query value will be instructed by the overflow configuration flag 162 to also check the data store 116. The service provider environment 102 may store the overflow configuration flag 164 in a data store such as an object data store, a SQL (structured query language) data store, a NoSQL data store, or another virtualized data store. The overflow configuration flag 164 may instruct a query process to check the data store 116 and the cache 118 for return values.

Figure 2:
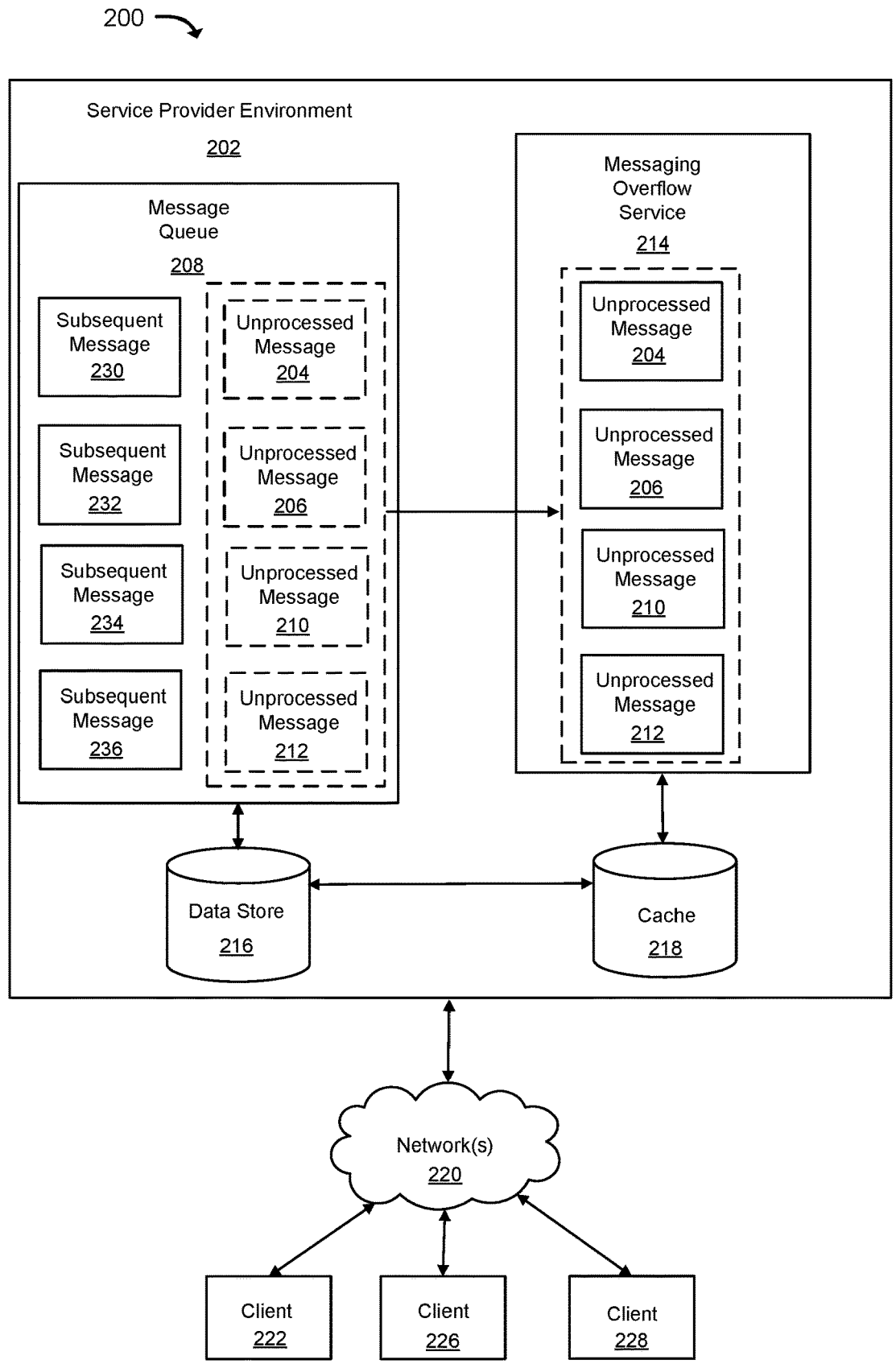
FIG. 2 is a block diagram illustrating a messaging overflow service consuming messages from a message queue according to an example of the present technology.

FIG. 2 illustrates a computing environment 200 for a messaging overflow service 214 to consume unprocessed messages according to a simplified example of the present technology. The computing environment 200 may include some or all of the features and capabilities of computing environment 100 of FIGS. 1A-1B. For example, the computing environment 200 may include a service provider environment 202, a message queue 208, a data store 216, a messaging overflow service 214, a cache 218, a network 220, and clients 222, 224, and 226 which may have the same features and capabilities of the service provider environment 102, the message queue 108, the data store 116, the messaging overflow service 114, the cache 118, the network 120, and the clients 122, 124, and 126 of FIGS. 1A-1B.

The computing environment 200 depicts the message queue 208 with unprocessed messages 204, 206, 210, and 212. The unprocessed messages 204, 206, 210, and 212 may be of a number or a size that exceeds a predetermined threshold that is monitored by a monitoring service (not shown) for the message queue 208. The monitoring service may then trigger an alarm that activates the messaging overflow service 214. The messaging overflow service 214 may then consume the unprocessed messages 204, 206, 210, and 212 from the message queue 208. Once the unprocessed messages 204, 206, 210, and 212 are consumed from the message queue 208 they are deleted or removed from the message queue 208, hence the unprocessed messages 204, 206, 210, and 212 removed by the messaging overflow service 214 from the message queue 208 are depicted with dotted lines in FIG. 2. The messaging overflow service 214 then processes the unprocessed messages 204, 206, 210, and 212 and the processed values for the unprocessed messages 204, 206, 210, and 212 are stored in the cache 218 associated with the messaging overflow service 214.

The message queue 208 may continue to receive messages after the message queue 208 is drained by the messaging overflow service 214. The additional messages are represented by the subsequent messages 230, 232, 234, and 236. The subsequent messages 230, 232, 234, and 236 may be processed by the message queue 208 and associated message handlers in parallel to the messaging overflow service 214 processing the unprocessed messages 204, 206, 210, and 212. Processed data store values for the subsequent messages 230, 232, 234, and 236 processed by the message queue 208 may be stored in the data store 216. In one alternative aspect, the subsequent messages 230, 232, 234, and 236 are consumed by the messaging overflow service 214 and processed by the messaging overflow service 214.

Figure 3:
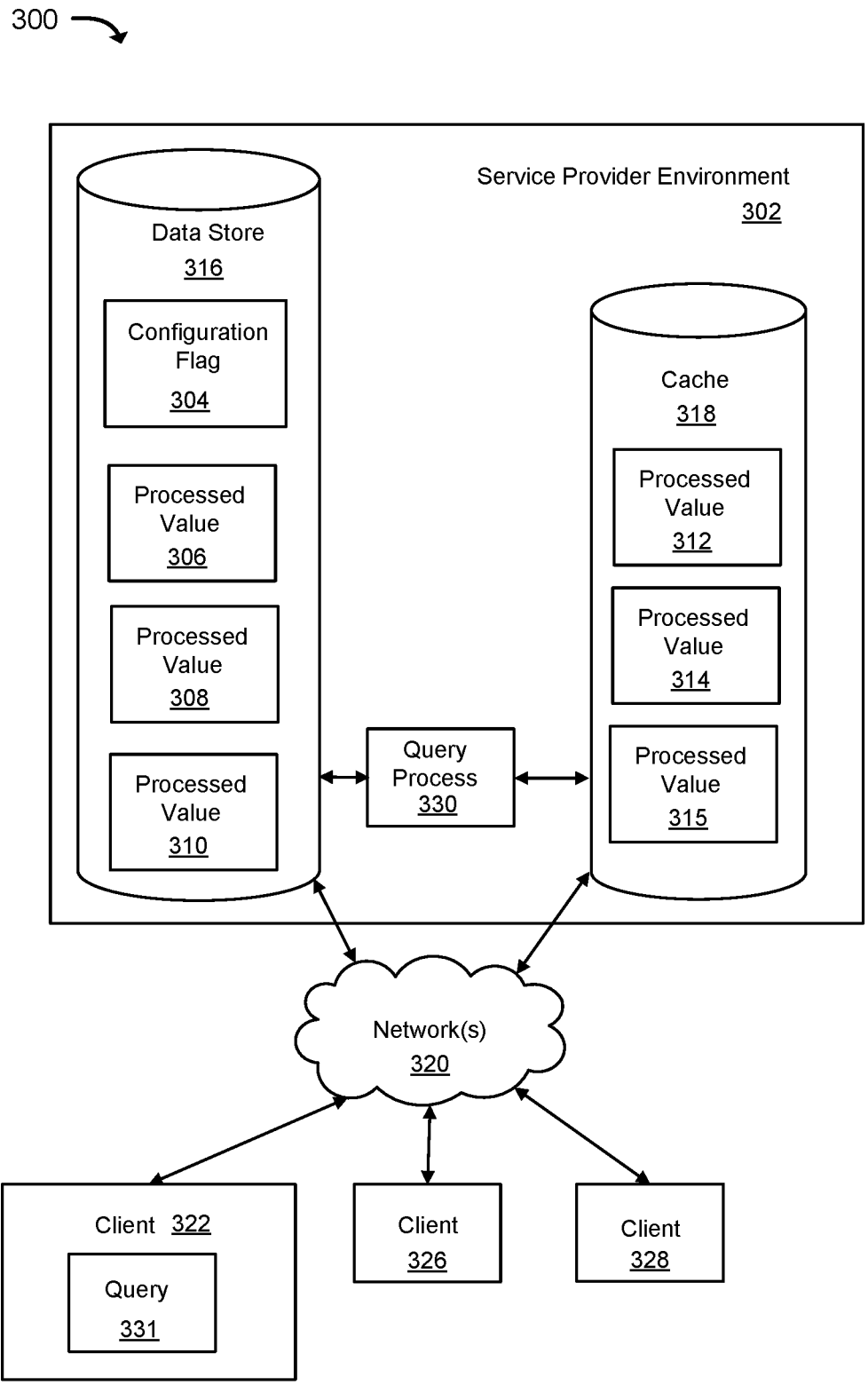
FIG. 3 is a block diagram illustrating a data store using an overflow configuration flag according to an example of the present technology.

FIG. 3 illustrates a computing environment 300 with a data store comprising an overflow configuration flag 304 according to an example of the present technology. The computing environment 300 may include some or all of the features and capabilities of computing environment 100 of FIGS. 1A-1B. For example, the computing environment 300 may include a service provider environment 302, a data store 316, a cache 318, a network 320, and clients 322, 324, and 326 which may have the same features and capabilities of the service provider environment 102, the message queue 108, the data store 116, the messaging overflow service 114, the cache 118, the network 120, and the clients 122, 124, and 126 of FIGS. 1A-1B or similar components of FIG. 2.

The computing environment 300 comprises the client 322 with a query 331. The query 331 may be a submitted to a query process 330 in the service provider environment 302. The query 331 may be a data store query in text form. The query process 330 may be associated with an application executing on the client 322. The query process 330 may be a query process that queries the data store 316 for a processed data store value that was stored in the data store 316 after a message was processed. The service provider environment 302 may also host the cache 318 that is associated with a messaging overflow service that has processed data store values. The processed data store values in the data store 316 are depicted as processed values 306, 308, and 310 and the processed data store values in the cache 318 are depicted as processed values 312, 314, and 315. In one scenario, the query process 330 may query the data store 316 for a processed data store value that pertains to a processed value 312. The data store 316 does not include the processed value 312 and therefore may not return the processed value 312 to the query process 330. Thus, the query process 330 may not receive the most up to date information by only querying the data store 316. To compensate for data that is stored in either the data store 316 or the cache 318, the messaging overflow service may set an overflow configuration flag 304 in the data store 316. The overflow configuration flag 304 instructs the query process 330 to check both the data store 316 and the cache 318 for processed data store values. Thus, if the query process 330 queries the data store 316 for a processed data store value that pertains to a processed value 312, the data store 316 may not be able to return the processed value 312 but the overflow configuration flag 304 instructs the query process 330 to query the cache 318 and the cache 318 may return the processed value 312 to the query process 330. Thus, the overflow configuration flag 304 allows the query process 330 to receive the most updated information. The messaging overflow service may later update the data store 316 with the processed values 312, 314, and 315 and the overflow configuration flag 304 may then be cleared or removed from the data store 316.

Figure 4:
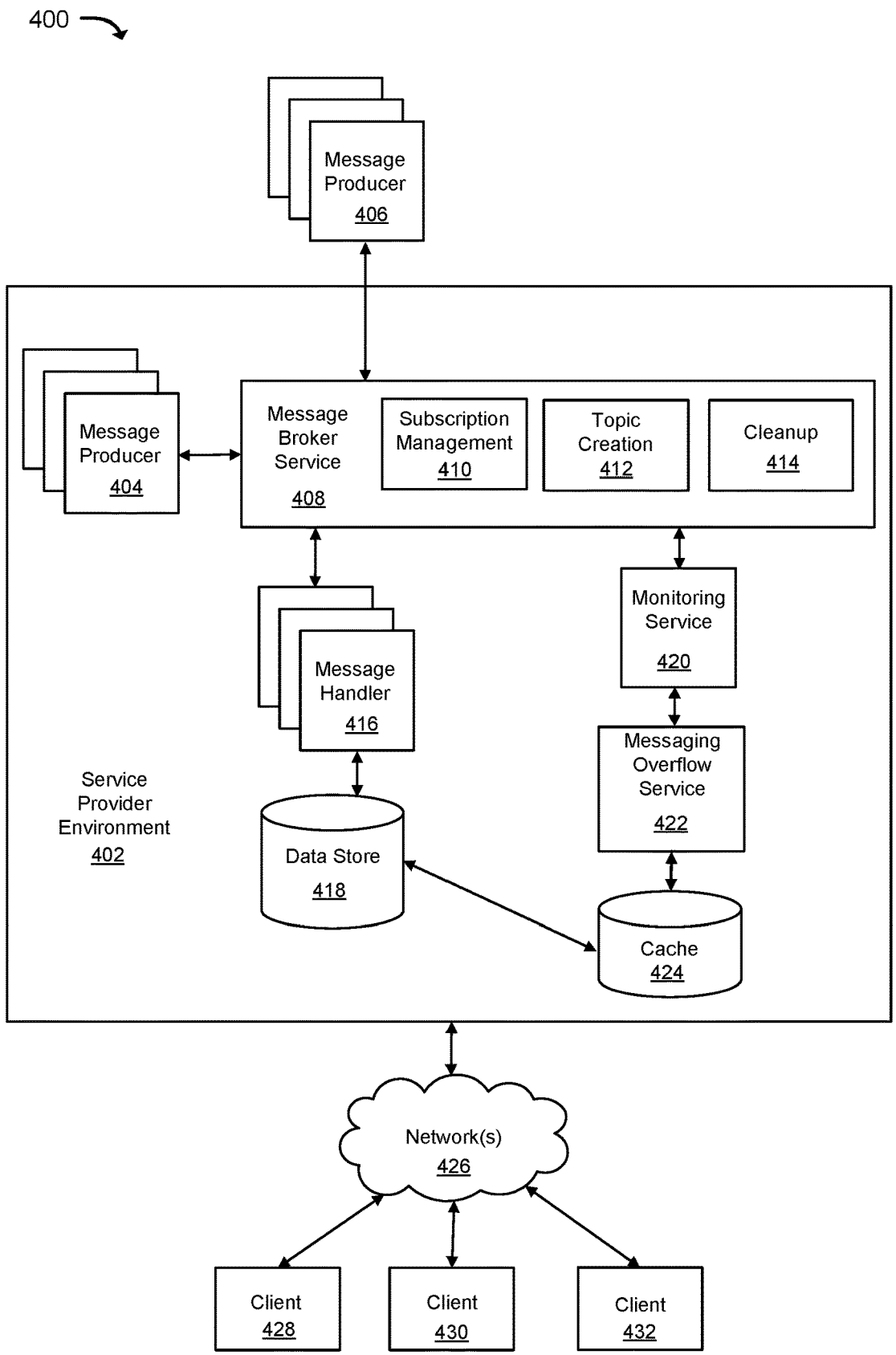
FIG. 4 is a block diagram that illustrates an example messaging system with a messaging overflow service based on a publish-subscribe model according to an example of the present technology.

FIG. 4 illustrates a computing environment 400 for a publish-subscribe model with a messaging overflow service according to an example of the present technology. The computing environment 400 may include some or all of the features and capabilities of computing environments of FIGS. 1-3. For example, a computing environment 400 may include a service provider environment 402, a message producer 404 inside the service provider environment 402, a message producer 406 outside the service provider environment, a message handler 416, a data store 418, a monitoring service 420, a messaging overflow service 422, a cache 424, a network 426, and clients 428, 430, and 432 which may have the same features and capabilities of the similar components of FIGS. 1-3. The computing environment 400 may represent components for or associated with a messaging service based on a publish-subscribe model (pub/sub model).

A pub/sub model may include topics and a client or a message producer may publish messages to a topic. Subscribers (i.e., clients) may subscribe to a topic to receive the messages or data that are published to that topic. The message handler 416 is a subscriber which may receive a message from message broker service 408, as sent from the message producer 404, 406. A subscriber may also receive a message for a topic from the message broker service 408. A subscriber may subscribe to the topic to receive the messages associated with the topic. A pub/sub model may include a plurality of message producers and message subscribers and may use a message broker service 408 to enable the message hander 416 to receive messages as a subscriber in conjunction with writing processed data store values from the processed messages to the data store 418.

The computing environment 400 may have components for the pub/sub model such as subscription management 410, topic creation 412, and/or cleanup 414. The subscription management 410 module may be used to communicate the messaging topics and/or subscriptions across a plurality of messaging nodes in the message broker service 408 to manage the topics and subscriptions. The subscription management 410 module may be used to replicate topics and subscriptions to a topic across multiple messaging nodes. This may be due to a large number of topics or subscriptions for the given topic. The subscription management 410 module may utilize an eventually consistent communication model where topics and subscriptions for a topic are replicated to multiple nodes within the service provider environment 202 asynchronously. The topic creation 412 module or server may be a component of a message broker service 408 and allows topics for a publish-subscribe model to be created. The topics may be user created or machine created. The cleanup 414 module is also associated with the message broker service 408 and is employed to cleanup topics. For example, a topic may be removed that is no longer in use. The cleanup 414 module may also delete a topic after receiving a command from a user, and the cleanup 414 may also be employed to delete subscriptions to a topic. The monitoring service 420 may monitor the message broker service 408 or a message queue associated with the message broker service 408 to determine if the number of messages for one or more topics processed by the message broker service 408 have exceeded a predetermined threshold or if the data store 418 is experiencing latency. The monitoring service may then trigger an alarm that will launch the messaging overflow service 422. The messaging overflow service 422 may consume messages, as described before, and write processed data store values to the cache 424. In one configuration, once the messaging overflow service has terminated the data stores values in the cache 424 may be added back into the data store 418. In one aspect, a message queue of the message broker service may be directly accessed by an application programming interface (API) call. For example, the messaging overflow service 422 may use API calls to access the message queue associated with the message broker service 408 to consume the unprocessed messages.

Figure 5:
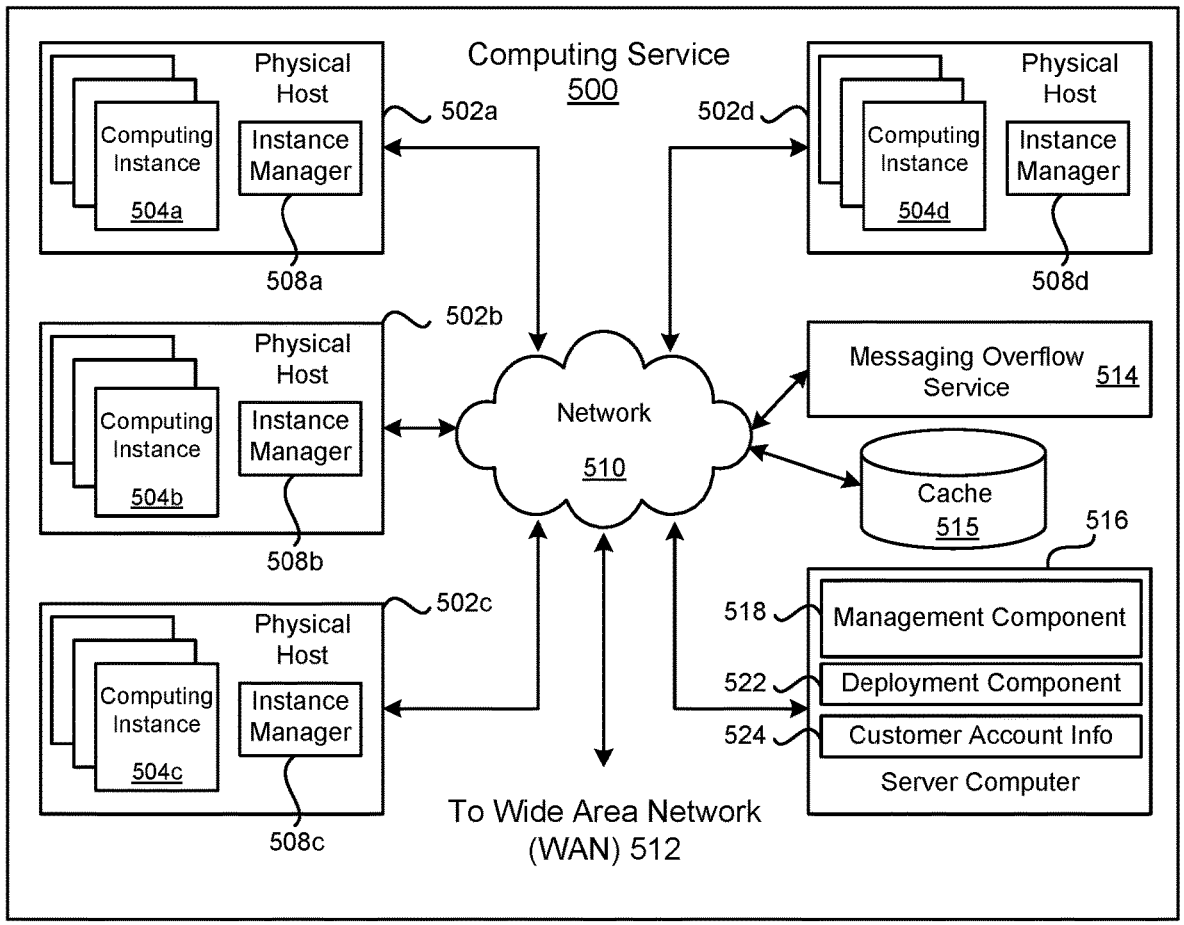
FIG. 5 is a block diagram that illustrates an example computing service environment according to an example of the present technology.

FIG. 5 is a block diagram illustrating an example computing service 500 that may be used to execute software services in a computing service environment or service provider environment. In particular, the computing service 500 depicted illustrates one environment in which the technology described herein may be used. The computing service 500 may be one type of environment that includes various virtualized service resources that may be used, for instance, to host computing instances 504a-d on which a computing service may execute.

The computing service 500 may be capable of delivery of computing, storage and networking capacity as a software service to a community of end recipients. In one example, the computing service 500 may be established for an organization by or on behalf of the organization. That is, the computing service 500 may offer a "private cloud environment." In another example, the computing service 500 may support a multi-tenant environment, wherein a plurality of customers may operate independently (i.e., a public cloud environment). Generally speaking, the computing service 500 may provide the following models: Infrastructure as a Service ("IaaS"), Platform as a Service ("PaaS"), and/or Software as a Service ("SaaS"). Other models may be provided. For the IaaS model, the computing service 500 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 500. End customers may access the computing service 500 using networked client devices, such as desktop computers, laptops, tablets, smartphones, etc. running web browsers or other lightweight client applications, for example. Illustratively, the computing service 500 may be described as a "cloud" environment.

The particularly illustrated computing service 500 may include a plurality of server computers 502a-d. While four server computers are shown, any number may be used, and large data centers may include thousands of server computers. The computing service 500 may provide computing resources for executing computing instances 504a-d. Computing instances 504a-d may, for example, be virtual machines. A virtual machine may be an instance of a software implementation of a machine (i.e., a computer) that executes applications like a physical machine. In the example of a virtual machine, each of the server computers 502a-d may be configured to execute an instance manager 508a-d capable of executing the instances. The instance manager 508a-d may be a hypervisor, virtual machine monitor (VMM), or another type of program configured to enable the execution of multiple computing instances 504a-d on a single server. Additionally, each of the computing instances 504a-d may be configured to execute one or more applications.

In one aspect, the computing service 500 may include a messaging overflow service 514 which may be a dynamic service that activates in response to an alarm that is triggered when a message queue has a queue of messages that reach a predetermined threshold. The computing service 500 may also include a cache 515 associated with the messaging overflow service 514. The messaging overflow service 514 may consume unprocessed messages from the message queue and then store processed values or data store entries in the cache 515. The computing instances 504a-d may represent resources for executing a message queue, message producers, message handlers, or a data store.

One or more server computers 516 may be reserved to execute software components for managing the operation of the computing service 500 and the computing instances 504a-d. A server computer 516 may execute a management component 518. A customer may access the management component 518 to configure various aspects of the operation of the computing instances 504a-d purchased by a customer. For example, the customer may setup computing instances 504a-d and make changes to the configuration of the computing instances 504a-d.

A deployment component 522 may be used to assist customers in the deployment of computing instances 504a-d. The deployment component 522 may have access to account information associated with the computing instances 504a-d, such as the name of an owner of the account, credit card information, country of the owner, etc. The deployment component 522 may receive a configuration from a customer that includes data describing how computing instances 504a-d may be configured. For example, the configuration may include an operating system, provide one or more applications to be installed in computing instances 504a-d, provide scripts and/or other types of code to be executed for configuring computing instances 504a-d, provide cache logic specifying how an application cache may be prepared, and other types of information. The deployment component 522 may utilize the customer-provided configuration and cache logic to configure, initialize, and launch computing instances 504a-d. The configuration, cache logic, and other information may be specified by a customer accessing the management component 518 or by providing this information directly to the deployment component 522.

Customer account information 524 may include any desired information associated with a customer of the multi-tenant environment. For example, the customer account information may include an identifier for a customer, a customer address, billing information, licensing information, customization parameters for launching instances, scheduling information, etc. As described above, the customer account information 524 may also include security information used in encryption of asynchronous responses to API requests. By "asynchronous" it is meant that the API response may be made at any time after the initial request and with a different network connection.

A network 510 may be utilized to interconnect the computing service 500 and the server computers 502a-d, 516. The network 510 may be a local area network (LAN) and may be connected to a Wide Area Network (WAN) 512 or the Internet, so that end customers may access the computing service 500. The network topology illustrated in FIG. 5 has been simplified; many more networks and networking devices may be utilized to interconnect the various computing systems disclosed herein.

Figure 6:
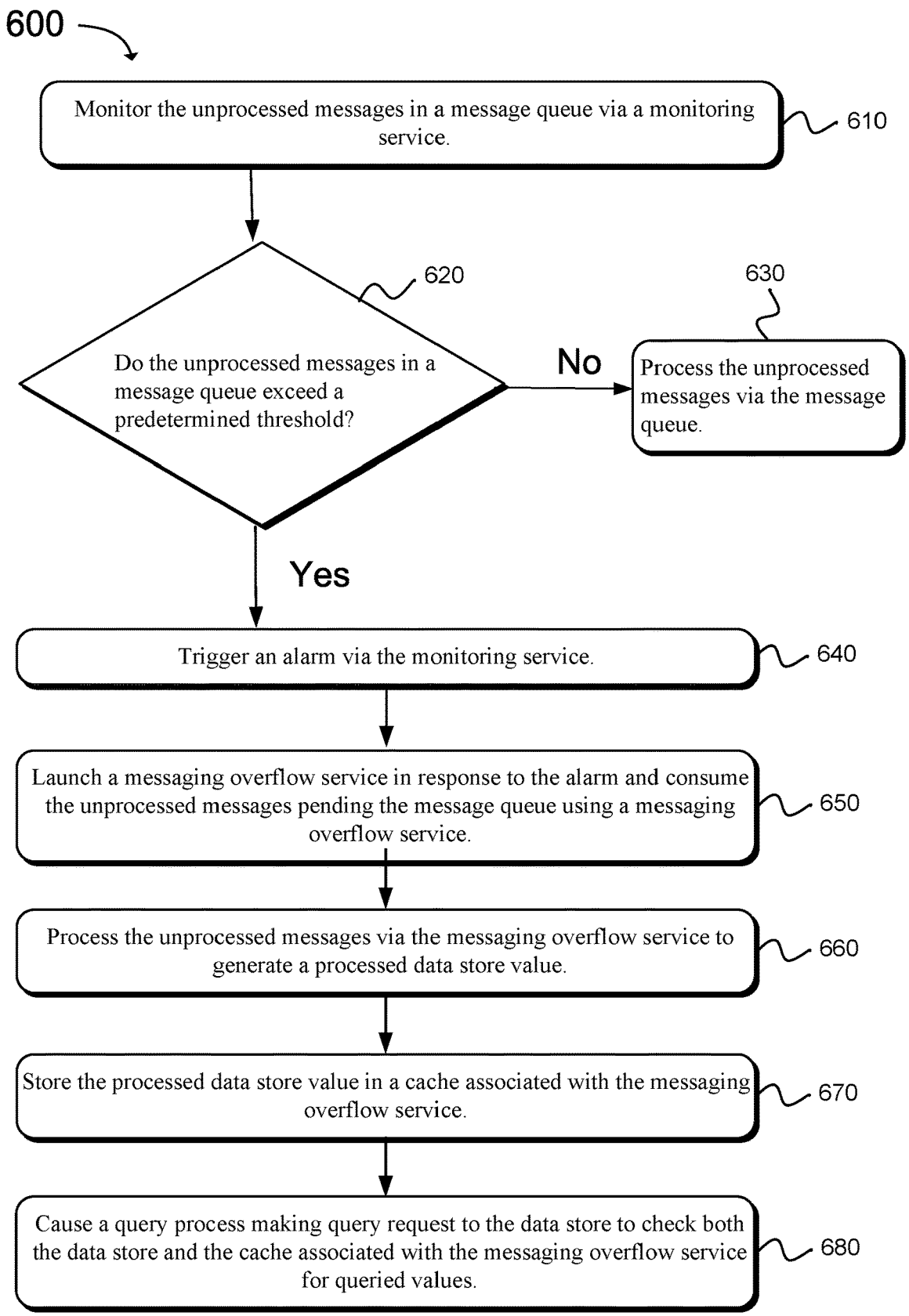
FIGS. 6 and 7 are flowcharts of example methods for addressing messaging overflow in a messaging service according to an example of the present technology.

FIG. 6 is a flowchart of an example method 600 for reducing latency in a messaging service according to an example of the present technology. The messaging service may be a distributed message queuing service or may be based on a publish-subscribe model. The functionality 600 may be implemented as a method and executed as instructions on a machine, such as a virtual machine or a hardware server, where the instructions are included on at least one computer readable medium or one non-transitory machine-readable storage medium. For example, starting in block 610, the unprocessed messages in a message queue may be monitored via a monitoring service. An operation may be performed to determine if the unprocessed messages in a message queue exceed a predetermined threshold, as in block 620. If no, then the unprocessed messages are processed via the message queue, as in block 630. If yes, then an alarm is triggered via the monitoring service, as in block 640.

A messaging overflow service may be launched in response to the alarm and the unprocessed messages pending in the message queue are consumed using a messaging overflow service, as in block 650. The alarm may also trigger a cache associated with the messaging overflow service to be launched. The cache may or may not be hosted by the same computing instance as the messaging overflow service. For example, the alarm may be triggered by a monitoring service that monitors the pending messages (e.g. the unprocessed messages) in the message queue. The messaging overflow service may be launched in a service provider environment. The messaging overflow service may consume some or all of the messages in the message queue. The unprocessed messages are processed via the messaging overflow service to generate a processed data store value, as in block 660. For example, the messaging overflow service may have message handlers that are able to process messages in the same manner as message handlers retrieving messages from a distributed messaging system handle messages. The processed data store value may be stored in a cache associated with the messaging overflow service, as in block 670. The cache may be a data store that is local to the messaging overflow service. A query process making a query request to the data store queries both the data store and the cache associated with the messaging overflow service for queried values, as in block 680. The query process may check both the messaging overflow service and the data store based on an overflow configuration flag placed in the data store or another storage location by the messaging overflow service. The messaging overflow service in conjunction with the cache and the overflow configuration flag ensures that the most updated query values are received by a query process.

In one aspect, the data store may be updated with the processed data store value from the cache. After the data store has been updated by the cache, the overflow configuration flag may be removed from the data store. The messaging overflow service may be shut down after the messaging overflow service has processed the unprocessed messages.

In an alternative configuration, the messaging overflow service may consume subsequent messages from the message queue after the messaging overflow service has processed the unprocessed messages initially consumed. In another configuration, after the messaging overflow service has consumed the unprocessed messages from the message queue, the message queue may continue to receive subsequent messages from message producers. The subsequent messages may be processed by the message queue using a message handler simultaneously to or in parallel to the messaging overflow service processing the unprocessed messages consumed from the message queue.

Figure 7:
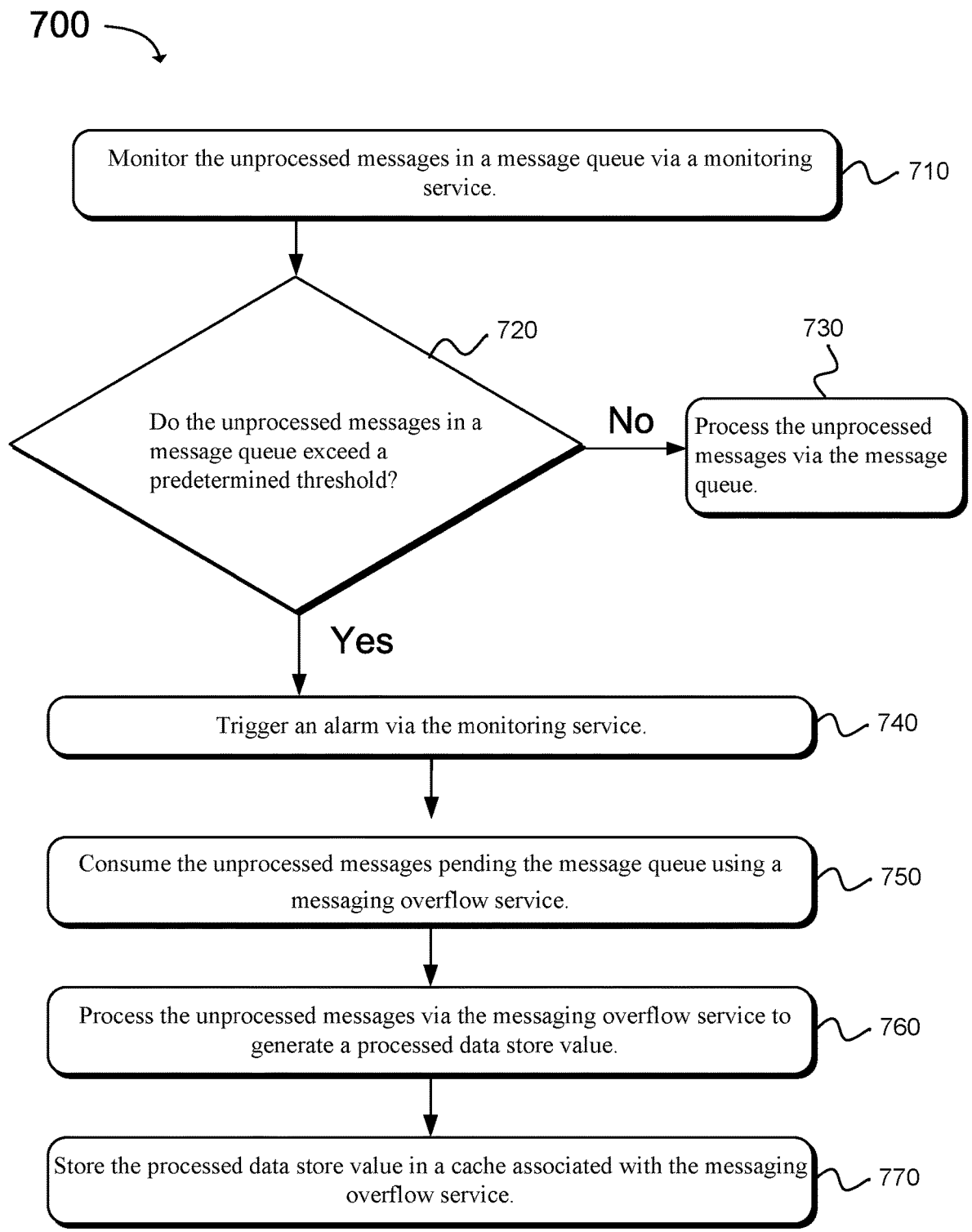

FIG. 7 is a flowchart of an example method 700 for addressing message overflow in a messaging service according to an example of the present technology. The messaging service may be a distributed message queuing service or may be based on a publish-subscribe model. The functionality 700 may be implemented as a method and executed as instructions on a machine, where the instructions are included on at least one computer readable medium or one non-transitory machine-readable storage medium. For example, starting in block 710, the unprocessed messages in a message queue may be monitored via a monitoring service. An operation is performed to determine if the unprocessed messages in a message queue exceed a predetermined threshold, as in block 720. If no, then the unprocessed messages are processed via the message queue, as in block 730. If yes, then an alarm is triggered via the monitoring service, as in block 740. The predetermined threshold may be a total number of messages in the message queue. The predetermined threshold may be a predefined total payload of all the unprocessed messages combined in the message queue. Alternatively, the predetermined threshold may be when unprocessed messages in the message queue have not been processed for a predefined amount of time. Yet another, predetermined threshold may be that the data store associated with the message queue is experiencing latency.

The messaging overflow service may be launched in response to the alarm triggered by the monitoring service. A messaging overflow service may consume the unprocessed messages, as in block 750. In one example, the messaging overflow service may be described as a dynamic service that launches or executes when called upon to carry out the processing task of consuming the unprocessed messages and then shuts down after the processing task has been completed. In an alternative example, the messaging overflow service may be configured to launch on a compute service and is a segment of program code that is capable of receiving parameters, performing processing, returning values, and the destination function is terminated at the computing instance once the messaging overflow service has consumed the designated amount of messages from the messaging queue. The unprocessed messages are processed via the messaging overflow service to generate at least one processed data store value, as in block 760. The processed data store value is stored in a cache associated with the messaging overflow service, as in block 770. In an additional configuration, the messaging overflow service may operate to process messages using message handlers in parallel to the receipt of subsequent messages in the messaging queue that are processed by the message queue.

In one aspect, the messaging overflow service may set or place an overflow configuration flag in the data store or in a data store engine to instruct a query process making a query request to the data store to check both the data store and the cache associated with the messaging overflow service for the queried values. This ensures that the query process will obtain the most updated values. Values stored in the cache may be moved or transferred to the data store. This may occur while the messaging overflow service is still executing messaging processing tasks or may occur after the messaging overflow service has executed all message processing tasks assigned to the messaging overflow service. After values have been updated to the data store from the cache, the overflow configuration flag may be cleared or removed and the messaging overflow service may shut down. The messaging overflow service may be shut down in response to a command or a notification from the monitoring service. For example, the monitoring service may notify the messaging overflow service that the messages in the message queue have fallen below the predetermined threshold. Alternatively, the monitoring service may instruct the messaging overflow service to consume subsequent messages sent to the message queue after the messaging overflow service consumed the initial batch or set of unprocessed messages.

Figure 8:
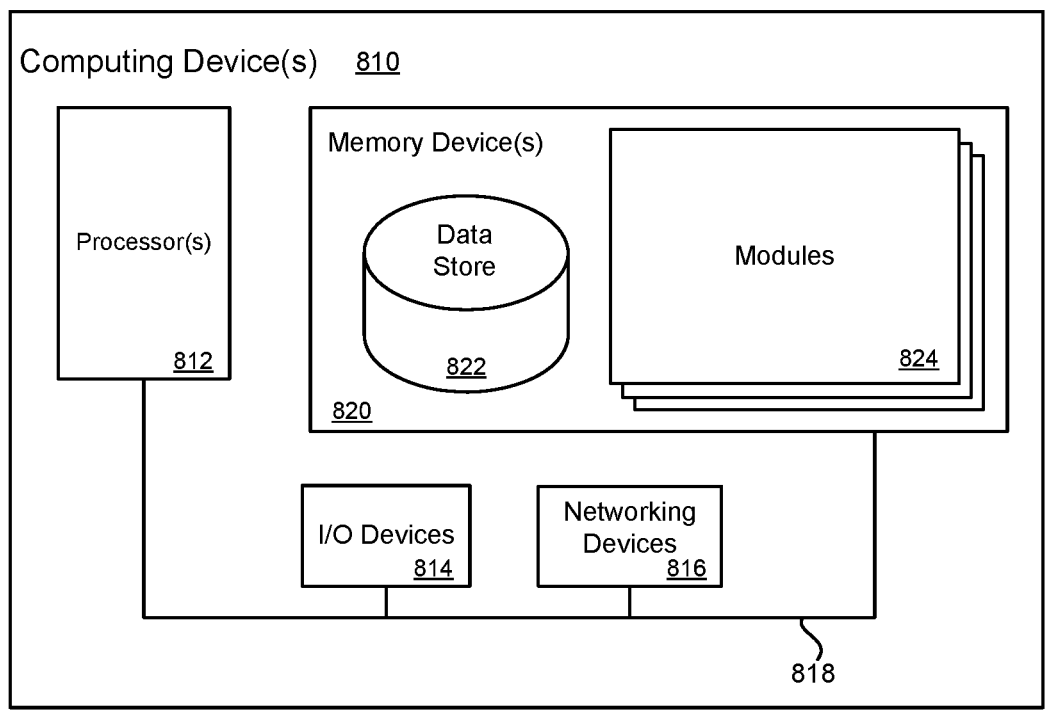
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the Internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid-state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed cause a processor to perform processing, comprising:

consuming unprocessed messages pending in a message queue using a messaging overflow service launched in response to an alarm triggered by a monitoring service that indicates the message queue has filled to a predetermined threshold, wherein a message handler associated with the message queue processes a first set of messages from the message queue, in parallel to the messaging overflow service, and stores a first set of processed data store values associated with the first set of messages processed by the message handler to a data store;

processing, by the messaging overflow service, a second set of messages from the unprocessed messages, in parallel to the first set of messages being processed by the message handler, to generate a second set of processed data store values;

storing the second set of processed data store values in a cache associated with the messaging overflow service;

enabling the first set of processed data store values and the second set of processed data store values to be available for delivery to a client;

causing a query process making a query request to the data store to check both the data store and the cache associated with the messaging overflow service for the processed data store values; and the message queue receiving subsequent messages after the messaging overflow service is launched;

wherein the subsequent messages are processed by the message handler associated with the message queue in parallel to the processing of the unprocessed messages using the messaging overflow service.

2. The non-transitory machine readable storage medium of claim 1, further comprising:

instructing a data store to set an overflow configuration flag associated with the message queue to instruct the query process making the query request to the data store to check both the data store and the cache associated with the messaging overflow service for the processed data store values;

updating the data store with the second set of processed data store values from the cache;

removing the overflow configuration flag; and shutting down the messaging overflow service.

3. The non-transitory machine readable storage medium of claim 1, wherein the messaging overflow service is launched in response to the message queue experiencing latency.

4. A method, under the control of at least one processor, comprising:

consuming unprocessed messages from a message queue using a messaging overflow service launched in response to an alarm triggered by a monitoring service that indicates the message queue has reached a predetermined threshold, wherein a message handler associated with the message queue processes a first set of messages from the message queue, in parallel to the messaging overflow service, and stores a first set of data store values associated with the first set of messages processed by the message handler to a data store;

processing, by the messaging overflow service, a second set of messages from the unprocessed messages, in parallel to the first set of messages being processed by the message handler, to generate a second set of processed data store values, using the at least one processor;

storing the second set of processed data store values in a cache associated with the messaging overflow service;

enabling the first processed data store values and the second set of processed data store values to be available for delivery to a client; and the message queue receiving subsequent messages after the messaging overflow service is launched;

wherein the subsequent messages are processed by the message handler associated with the message queue in parallel to the processing of the unprocessed messages using the messaging overflow service.

5. The method of claim 4, further comprising:
requesting activation of an overflow configuration flag in a data store associated with the message queue to instruct a query process making a query request to the data store to check the data store and the cache associated with the messaging overflow service for the processed data store values.

6. The method of claim 4, further comprising:
updating a data store associated with the message queue with the second set of processed data store values from the cache; and
clearing an overflow configuration flag in the data store.

7. The method of claim 6, further comprising:
shutting down the messaging overflow service after the data store has been updated and the overflow configuration flag is cleared.

8. The method of claim 4, wherein the predetermined threshold is a predefined number of the unprocessed messages.

9. The method of claim 4, wherein the predetermined threshold is a predefined total payload size of all of the unprocessed messages combined.

10. The method of claim 4, wherein the predetermined threshold is reached when the unprocessed messages in the message queue are not processed for a predefined period of time.

11. The method of claim 4, wherein the predetermined threshold is reached when a data store associated with the message queue is experiencing latency.

12. The method of claim 4, wherein the messaging overflow service is configured to launch on a compute service and is a segment of program code that is capable of receiving parameters and performing processing, and the messaging overflow service is terminated at a computing instance once the messaging overflow service completes processing of the unprocessed messages.

13. The method of claim 4, wherein the messaging overflow service is shut down in response to a notification from the monitoring service that subsequent messages received in the message queue are below the predetermined threshold after the messaging overflow service consumes the unprocessed messages.

14. The method of claim 4, wherein the message queue is part of a distributed message queuing service or is part of a message service based on a publish-subscribe model.

15. A system for message processing, comprising:
a messaging overflow service comprising:
at least one processor; and
a memory device including instructions to be executed by the at least one processor in order to:
launch the messaging overflow service and consume unprocessed messages pending in a message queue in response to an alarm triggered by a monitoring service that indicates the message queue has reached a predetermined threshold, wherein a message handler associated with the message queue processes a first set of messages from the message queue, in parallel to the messaging overflow service, and stores a first set of data store values associated with the first set of messages processed by the message handler to a data store;
process, by the messaging overflow service using the at least one processor, a second set of messages from the unprocessed messages, in parallel to the first set of messages being processed by the message handler, to generate a second set of processed data store values;
store the second set of processed data store values in a cache associated with the messaging overflow service;
enable the first processed data store values and the second set of processed data store values to be available for delivery to a client; and
receive, by the message queue, subsequent messages after the messaging overflow service is launched;
wherein the subsequent messages are processed by the message handler associated with the message queue in parallel to the processing of the unprocessed messages using the messaging overflow service.

16. The system of claim 15, the instructions further configured to:
set an overflow configuration flag in a data store associated with the message queue to instruct a query process making a query request to the data store to check both the data store and the cache associated with the messaging overflow service for the processed data store values.

17. The system of claim 15, the instructions further comprising:
update a data store associated with the message queue with the second set of processed data store values from the cache; and
clear an overflow configuration flag in the data store.

18. The system of claim 15, wherein the predetermined threshold is a predefined number of the unprocessed messages.

19. The system of claim 15, wherein the predetermined threshold is a predefined total payload size of all of the unprocessed messages combined.

20. The system of claim 15, wherein the predetermined threshold is reached when the unprocessed messages in the message queue are not processed for a predefined period of time.

* * * * *